(12) United States Patent
Benet Ballester et al.

(10) Patent No.: US 10,540,755 B2
(45) Date of Patent: Jan. 21, 2020

(54) IMAGE PROCESSING SYSTEMS AND METHODS

(71) Applicant: Light Blue Optics Ltd., Cambridge (GB)

(72) Inventors: Raul Benet Ballester, Cambridge (GB); Eyal Katz, Cambridge (GB); Barak Maoz, Cambridge (GB); Adrian James Cable, Cambridge (GB); Euan Christopher Smith, Cambridge (GB); Gareth John McCaughan, Cambridge (GB); Shane Thornton, Cambridge (GB)

(73) Assignee: Light Blue Optics Ltd., Cambridge (GB)

( * ) Notice: Subject to any disclaimer, the term of this patent is extended or adjusted under 35 U.S.C. 154(b) by 0 days.

(21) Appl. No.: 15/550,732

(22) PCT Filed: Feb. 12, 2016

(86) PCT No.: PCT/GB2016/050341
§ 371 (c)(1),
(2) Date: Aug. 11, 2017

(87) PCT Pub. No.: WO2016/128761
PCT Pub. Date: Aug. 18, 2016

(65) Prior Publication Data
US 2018/0040111 A1    Feb. 8, 2018

(30) Foreign Application Priority Data

Feb. 13, 2015 (GB) .................................. 1502448.2
Dec. 11, 2015 (GB) .................................. 1521896.9

(51) Int. Cl.
*G06T 5/00*    (2006.01)
*G06T 11/60*   (2006.01)
(Continued)

(52) U.S. Cl.
CPC .............. *G06T 5/005* (2013.01); *G06T 7/254* (2017.01); *G06T 2207/10016* (2013.01); *G06T 2207/20081* (2013.01)

(58) Field of Classification Search
CPC ..................... G06T 5/005; G06T 7/254; G06T 2207/10016; G06T 2207/20081
(Continued)

(56) References Cited

U.S. PATENT DOCUMENTS 7,427,983 B1    9/2008  Hildebrandt et al.
7,545,993 B2*   6/2009  Matsuda ................. G06T 5/006
                                                       348/240.99
(Continued)

FOREIGN PATENT DOCUMENTS

WO       WO00/21065         4/2000

OTHER PUBLICATIONS

Li-Wei He et al., "Real-Time Whiteboard Capture and Processing Using a Video Camera for Remote Collaboration", IEEE Transactions on Multimedia, vol. 9, No. 1, Jan. 2007, pp.
(Continued)

*Primary Examiner* — Quang N Vo
(74) *Attorney, Agent, or Firm* — HDC IP Law

(57) ABSTRACT

A method of capturing writing or drawing on a whiteboard comprises inputting camera data for a succession of image frames of the whiteboard, and processing data from said image frames to remove parts of the image frames corresponding to parts of a user or user pen writing or drawing on the whiteboard. The processing involves filtering to distinguish between i) motion of the user/user pen parts in the image frames, and ii) writing/drawing image information in the image frames which appears or changes during said writing or drawing but which is thereafter substantially
(Continued)

unchanging. The filtered data defines captured writing or drawing from the whiteboard.

19 Claims, 8 Drawing Sheets

(51) Int. Cl.
*H04N 5/04* (2006.01)
*G06T 7/254* (2017.01)

(58) Field of Classification Search
USPC .................. 358/3.26, 1.9, 1.15; 382/162
See application file for complete search history.

(56) References Cited

U.S. PATENT DOCUMENTS

| | | |
|---|---|---|
| 2003/0234772 A1 | 12/2003 | Zhang |
| 2004/0075820 A1 | 4/2004 | Chu et al. |
| 2006/0256388 A1 | 11/2006 | Erol |
| 2011/0141278 A1 | 6/2011 | Campbell et al. |
| 2011/0221919 A1 | 9/2011 | Zhang |
| 2012/0081548 A1* | 4/2012 | Zhang ............... H04N 7/183 348/143 |

OTHER PUBLICATIONS

Anon., "Method for Semantically Sorting Digitally Captured Whiteboard Images Using Erasers", Ip.com No. IPCOM00218133D, May 23, 2012.
Davila, Kenny et al., "Whiteboard Video Summarization via Spatio-Temporal Conflict Minimization", 2017 14th IAPR ICDAR, IEEE v. 1, pp. 355-362, Nov. 9, 2017.
Internation Search Report, dated Mar. 11, 2019.
Internation Search Report, dated Jul. 25, 2016.
UKIPO Search Report, dated Jul. 13, 2016.
Li-wei He, et al "Why Take Notes: Use the Whiteboard Capture System" Microsoft Research Technical Report MSR-TR-2002-89 Sep. 2002.
USPTO Issued Office Action dated Apr. 18, 2019 in U.S. Appl. No. 15/831,070, filed Dec. 4, 2017.

* cited by examiner

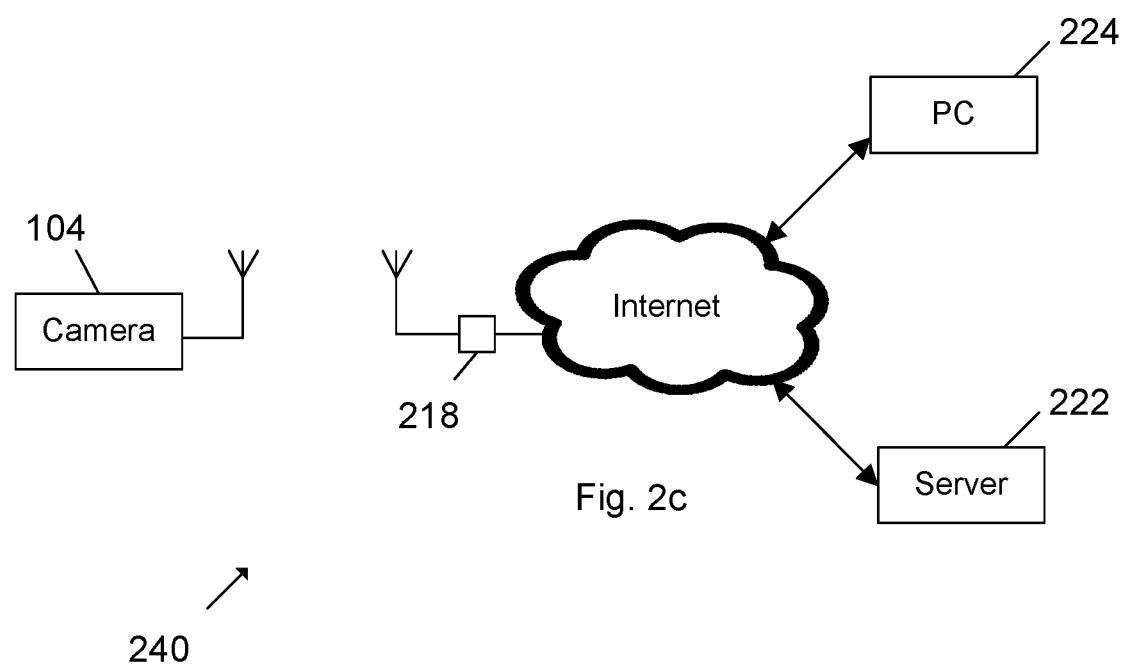

Person removed

Cleaned up

IMAGE PROCESSING SYSTEMS AND METHODS

FIELD OF THE INVENTION

This invention relates to systems, methods, apparatus and computer program code for capturing information, such as writing or drawing, on a whiteboard or the like.

BACKGROUND TO THE INVENTION

There are many ways to share image information over the internet but these tools are generally driven by technology rather than led by users. In particular many people use dry erase whiteboards and similar surfaces in both the work and home environments but, as yet, there is no simple and effective way to capture or share information on such a whiteboard. Typically a user wanting to capture or share information will take a photograph with a mobile phone and then email this, but such photographs are often of poor quality and difficult to read, frequently exhibiting distortions and large regions of reflective light beneath which it is difficult to discern the content. It is possible to purchase whiteboards with a built in scanner but these are cumbersome and expensive devices and are often more suited to printing than sharing information.

A whiteboard image capture system has been described by Microsoft Corporation in, '*Why Take Notes? Use the Whiteboard Capture System*', L. He et al, Microsoft Research Technical Report: MSR-TR-2002-89. This describes a colour-based approach in which writing is distinguished from the background whiteboard by comparison with the whiteboard colour. However this approach suffers from some serious defects. Although the human eye exhibits colour constancy, to a camera the colour and intensity of the whiteboard varies substantially with ambient light level and quality. Furthermore the Microsoft system employs a camera viewing the whiteboard essentially normal to the whiteboard whereas for a practical system it is desirable to be able to view the whiteboard from an acute angle. However when viewed from an acute angle the whiteboard surface is highly reflective, and this can result in a substantial degree of specular reflection, and "coloured shadows" from the user, which the colour-based approach of the Microsoft system does not handle well.

Accordingly there is a need for improved approaches.

SUMMARY OF THE INVENTION

Image Capture

According to the present invention there is therefore provided a method of capturing writing or drawing on a whiteboard, the method comprising: inputting camera data for a succession of image frames, wherein said camera data is from a camera directed towards said whiteboard and said image frames comprise successive images of said whiteboard from said camera; user filter processing data from said image frames to remove parts of said image frames corresponding to parts of a user or user pen writing or drawing on said whiteboard; wherein said user filter processing comprises filtering to distinguish between motion of said user/user pen parts in said image frames and writing/drawing image information in said image frames which appears or changes during said writing or drawing but which is thereafter substantially unchanging; and outputting writing/drawing data from said user filter processing, wherein said writing/drawing data defines captured writing or drawing on said whiteboard.

For the avoidance of doubt references in this specification to a 'whiteboard' include other similar surfaces which may be used for writing, drawing or similar, typically but not necessarily using a dry eraser. Thus 'whiteboard' includes white, write-on walls, glass panels intended for a similar purpose to a whiteboard, and the like. A "whiteboard" is generally, but not necessarily white. Again for the avoidance of doubt, although the techniques we describe are typically used for capturing writing or drawing on a whiteboard, and are particularly adapted to this purpose, they are not limited to capturing writing or drawing. In broad terms the techniques we describe are particularly suited to capturing information which dynamically changes and is thereafter stable, and thus they may be used to capture other information, for example information on stick-on labels applied to a whiteboard.

Embodiments of the methods we describe are typically employed for sharing information written or drawn on a whiteboard, for example by sending the writing/drawing data derived from the image processing over a wired or wireless network for viewing, printing or the like at a remote location. However the captured information may be processed in other ways, for example by printing, storing in (non-volatile) memory, post-processing by an object or handwriting recognition system, and the like. In preferred embodiments of the method the captured and output data is dynamic in the sense that the writing/drawing is captured as a quasi-continuous process. The output writing/drawing data may thus comprise a data stream, in embodiments in real time, in embodiments in full colour, showing the evolution of the subject matter written/drawn onto and/or erased from the whiteboard. The skilled person will appreciate that this data may be shared in any convenient manner.

In broad terms, embodiments of the invention aim to provide a substantially undistorted image, substantially free of reflections, and substantially free of any part of the user writing on the whiteboard. To achieve this embodiments of the method perform user filter processing as described above to filter out or remove parts of the user (which here includes the user's pen and similar) from the captured image frames.

Preferably this user filter processing is performed after distortion correction to remove keystone and other distortion from the captured image data, as described further below. However this is not essential as, in principle, the user filter processing, and the other processing described below, may be performed in a distorted image space and then distortion correction applied afterwards. Applying distortion correction to the output data can even have computational advantages, in that such distortion correction need only be applied to the changing parts of the output data.

The image processing we describe may be performed at the image capture device (typically a camera), or on a local general purpose or dedicated computing device, or in the cloud, or using a combination of these two approaches. For example captured image data may be compressed and sent to a remote server to perform the image processing we describe (after decompression), and the server may then store and/or forward and/or return the processed output data. More generally the processing may be distributed between a local device and a remote server and, optionally data transmitted or exchanged between these elements in compressed form.

In broad terms, as previously described the user filter processing aims to remove parts of image frames corresponding to parts of the user/user pen (in the output data the removed parts may correspond to a background, generally white image region). Thus the user filter processing applies filtering to distinguish between motion of the user/pen parts and image information—typically writing/drawing—which appears within an image frame but which is thereafter substantially unchanging. For the avoidance of doubt the reference to "substantially unchanging" does not mean that the writing/drawing is never erased—the techniques we describe are also able to update the output data when parts of the writing/drawing are erased—but merely refers to a characteristic of the writing/drawing as it appears on a whiteboard as contrasted with, for example, motion of the user applying (or erasing) the writing/drawing.

Separating these two different sources/types of change, that is the user and the writing/drawing, within the captured image frames is not straightforward. In preferred embodiments this separation is achieved by subdividing the image frames into blocks. The blocks are preferably, but not necessarily, regular/rectangular. In some preferred embodiments the blocks tile the image region but in other approaches blocks may overlap, for example as a moving window, and/or overlapping blocks at different scales may be employed.

Such blockwise image processing has been found to be important in achieving good results in a practical system because it helps to distinguish between different spatial scales of change. In broad terms this is because blocks with large scale change can be distinguished as writing may have a relatively small effect on the image content of a block.

In embodiments the user filter processing determines when the image content of a block has changed by less than a threshold over a user filter time interval. This may comprise a discrete calculation, for example by counting instances when a degree of change between boxes less than a threshold, or a running average or similar may be used (in other language FIR and/or IIR filter techniques may be employed). In either case, where it is identified that the image content of a block has not changed by more than a threshold for some characteristic time, that block may then be marked or identified as not including user or pen parts. Once a block has been identified as being stationary for the user/filter time interval it may then be updated with the image content of that block, to thereby provide output image data comprising just the writing/drawing information. In preferred embodiments the user filter time interval is preferably relatively long, for example greater than 0.1 second or 0.5 seconds, for example of order 1 second.

Experiments have established that even when, say, a user's arm and hand is apparently stationary, for example hovering above a writing position, in reality the arm still makes small movements which are readily detectable by a camera. This is partly because the human eye tends to process out imperfections which the camera sees—for example skin may appear to have a uniform tone or a person's sleeve may appear to be of a uniform colour, but an image captured by a camera will see texture. Thus it has been established in practice that when an image block is substantially 'stationary' (preferably after normalisation as described further below), it is a legitimate assumption that that block does not contain part of the user (or their pen).

The skilled person will appreciate that there is a range of different techniques which may be employed to determine whether or not there has been a change in a block between successive image frames. In one approach corresponding blocks in frames at different times are compared to determine a measure, preferably but not essentially a normalised measure, of the difference between pixel values of the blocks. This measure may be compared against the threshold, and when the measure remains less than a threshold or greater than the user filter time interval the block may be identified as 'stationary'. Optionally such a determination may be subject to an additional comparison step between the first and last frames of a sequence of frames over the user filter time interval.

In one exemplary embodiment a difference measure is determined for each block in a frame by determining the absolute difference between values of corresponding pixels in the same block of, say, frame n and frame n-1. These absolute different values may then be summed and optionally normalised by dividing by the total number of pixels in the block. A counter may be reset to zero if the measure is greater than the threshold and incremented (by one) for each successive frame when the measure is less than the threshold until a frame count is achieved defined by the user filter time interval. For example with captured image data at 30 frames per second, a one second user filter time interval corresponds to a count of 30. At this point the person can be assumed to be absent from that block and the output data updated with the pixel data from the block. Optionally an additional constraint may be added by comparing the first and last frames of the sequence (in this example of 30 frames), imposing a constraint that this is not permitted to change by greater than a further threshold. This latter constraint can help to identify very slow motion within a block in which the change from one frame to another is less than the threshold. In other alternative approaches non-linear or statistical techniques may be used as an equivalent to the described use of a threshold (for example a threshold may be expressed as a probabilistic criterion), and references to a threshold are intended to encompass these alternatives.

If the user filter time interval is too short then parts of the user may appear. However the procedure is self-healing in that, in preferred embodiments, each block which is determined to be 'stationary' is updated. Thus in this case the visible user parts will disappear after a further user filter time interval. If, however, the time is too large the appearance of writing in the output data will be subject to a delay, and thus it may be generally preferable to err on the side of a too short rather than too long filter time.

As previously mentioned, the choice of block size has some influence over the behaviour of the user filter processing. As will be explained further below, the blocksize also has an effect on processing to reduce optical artefacts in the captured images. Here "optical artefacts" refers to changes in illumination across the whiteboard resulting from, for example, reflections, shadows and the like.

As previously mentioned, preferably a block is relatively large compared to the width of writing/drawing by a pen. Thus, for example, the area of a block in square pixels is preferably at least 10 or 20 times the area of the tip of the pen writing or drawing on the whiteboard, where the pen tip is a proxy for the width of the line produced by the pen. The particular block size and number of blocks in an image will depend, inter alia, upon the size of whiteboard or whiteboard region captured/processed and upon the resolution of the camera. For example for a 60 inch diagonal whiteboard, with a camera image of resolution 1920 by 1440 pixels, the image may be subdivided into 40 by 40 blocks each of 48 by 36 pixels. The width of dry eraser pens tends to be similar from one pen to another. In this particular example the width of a pen is typically of order 7-8 pixels, and thus the blocks are around 5 pen widths in each dimension.

Optionally a block dimension may be adapted, manually (for example with a software setting) or automatically, according to the camera resolution and/or board size and/or pen width. For example one of a predetermined set of block sizes may be selected on installation.

It is desirable to substantially reduce or preferably eliminate reflected light and other similar artefacts from the output writing/drawing data. This is also assisted by the blockwise image processing, in particular where the size of a block is small compared with the spatial scale of illumination changes across the board. In broad terms a block-by-block normalisation is applied, that is for each block aiming to normalise the brightness of the board in that particular block. This has the effect of making the image data relatively insensitive to spatial and temporal variations in brightness following such brightness normalisation processing. It will be appreciated that this is particularly effective where the scale of the change in illumination from optical artefacts/reflections is no smaller than a block whilst the scale of writing (pen width) is less than the blocksize. This allows the procedure to normalise brightness by, in effect, the expected value of light intensity. The skilled person will appreciate the in embodiments the blockwise normalisation procedure may be combined with the blockwise user filter processing.

In practice, preferred embodiments of the procedure take into account the effect that writing within a block pulls the mean pixel brightness downwards. For this reason in preferred embodiments the normalising is performed based on a brightness percentile greater than the $50^{th}$ percentile, $60^{th}$ percentile or $70^{th}$ percentile, for example based on the $80^{th}$ percentile brightness (where values greater than 50 correspond to increasing brightness). With this approach the brightness which is selected for normalising the pixel values in a block is effectively the background brightness of the whiteboard and is not much affected by the presence or otherwise of writing within the block. Thus in embodiments the procedure determines the $80^{th}$ percentile brightness of pixels within the block and then scales the pixel values of the block by the determined value. The skilled person will appreciate that this approach may be employed in either a monochrome or a colour image, and that variations on this general approach are possible whilst still effectively normalising according to a brightness percentile greater than the $50^{th}$ percentile. Thus brightness normalisation processing is able to make the method (and corresponding systems described later) relatively insensitive to environmental illumination and similar effects which can change the mean brightness across the whiteboard or other similar surface.

In a similar way to that described above, optical artefacts/reflections can also be attenuated by blockwise normalising one or more colour components, if the processed image is a colour image. Such a colour image may be in any colour space, for example RGB or HSV. Optionally the colour data may be converted to a different colour space for processing where one colour space is more effective than another for normalisation.

Although some preferred embodiments of the procedure employ user filter processing and brightness or colour normalisation processing as described above, in other approaches the user filter processing comprises temporally filtering the image frames with an appropriate user filter time constant as described above to distinguish the user and/or their pen from the writing/drawing on the whiteboard. In preferred implementations this also includes spatially filtering the image frames to attenuate changes in illumination across the whiteboard, as seen by the camera.

More generally a combination of spatial and temporal filtering may be employed to separate/attenuate one or more components of the image, in particular to distinguish amongst optical artefacts, writing, and the moving person/pen. For example optical artefacts have a long time constant and a large characteristic spatial scale; writing has a mid-range time constant and a small characteristic spatial scale; and a moving person/pen has a short time constant and a mid-range characteristic spatial scale.

As previously mentioned, preferred embodiments of the method employ distortion correction processing, preferably prior to the user filter processing.

In a preferred implementation the distortion correction processing includes applying a projective or other geometrical transform to the camera data to correct for the keystone distortion arising from the acute angle of camera view. An example embodiment of such processing is described later.

Preferably, but not essentially, the distortion correction also includes applying a lens distortion correction, in particular a barrel or fisheye lens distortion correction to facilitate use of a camera with a wide angle or fisheye lens. Such a lens may give a very wide field of view, potentially approaching 180°, but such lenses can also be expensive particularly if well-corrected. It is desirable to be able to provide a wide field of view but also to be able to use a relatively small and cheap lens. This can be achieved by allowing the lens to provide a distorted image and then correcting for the distortion, for example using published or measured data for the lens. In a typical system the camera with its lens is provided together with software (which may either be within the camera or elsewhere) and thus the camera lens characteristics are known and the correction can be pre-programmed, typically by applying a radially symmetric set of coefficients to the camera data, as described in more detail later.

As previously described, in preferred embodiments of the method, and later described systems, the camera is directed at an acute angle towards the whiteboard and distortion correction processing is then applied to correct for the resulting distortion. Acute angle viewing is strongly preferable for ease of practical implementation, but such an approach brings significant additional problems, in particular that surfaces such as a whiteboard surface tend to be highly reflective when viewed at an acute angle. Furthermore such specularly reflected light tends to be characteristic of the ambient light that is reflected rather than characteristic of the surface of the whiteboard. However the user filter processing and brightness or colour normalisation processing we have described above are, in embodiments, robust to such specular reflections as well as to other ambient lighting and similar effects such as shadows, changing light levels or colours (where a room is lit by both natural and artificial light), the use of a relatively dark or grey board in combination with relatively light ink, and so forth.

Optionally the effect of specular reflections may be further reduced by providing a polariser for the camera, in particular a polariser orientated to pass only the p-polarised component of light reflected off the whiteboard surface. At the typical acute angles that are employed (less than 60°, 45° or 30°) this can reduce reflections by around 50%. In a more sophisticated approach a switchable polariser is employed, such as a pi-cell to record both s- and p-polarisations, for example in alternate frames. Specular reflection may then be substantially entirely removed by taking a linear combination of such a pair of frames.

In preferred embodiments of the method a data clean-up procedure is applied to the image data from which the user has been removed. Preferably this comprises reprocessing the data output from the user filter processing, in particular to re-map one or more colours in the captured data into one or more replacement colours. In this way the output writing/drawing data may comprise the image data with bold, bright colours and a white background giving a visual effect which may be clearer than the original—the original, imaged whiteboard may not be white and the pen colours may be relatively unsaturated.

In some preferred implementations of the above described method the distortion correction and user filter processing (motion analysis) are preferably performed on monochrome image data from the captured camera image (which is generally in colour). The output of the user filter processing may have a reduced dynamic range in which the whiteboard is grey rather than white, and in which the writing is not a saturated black. In broad terms remapping of one or more replacement colours in the output writing/drawing data comprises identifying pixels in the output of the user filter processing which correspond to writing and then taking an average value of the pen colour for the pixels (which can be obtained from the distortion-corrected colour camera image), identifying a colour, and then re-mapping the colour, for example to a bold primary colour. It will be appreciated that such a re-mapping process may simply distinguish between the background (whiteboard) and writing/drawing, in which case multiple different pen colours may map to a common colour in the output data, or multiple different pen colours may map to multiple different output colours.

In a preferred approach the reprocessing/re-mapping is performed blockwise on the output image data from the user filter processing, employing a block-by-block threshold (different between blocks) to distinguish between writing and background. In embodiments the threshold for a block may be chosen according to a brightness percentile greater than the $50^{th}$, $60^{th}$ or $70^{th}$ percentile, for example the $80^{th}$ percentile.

This may be used to effectively define a threshold which corresponds to the expected brightness of the whiteboard. Then parts of the block which are writing/drawing may be identified as those parts which have a pixel brightness of less than a percentage (which may be 100%) of the threshold brightness percentile. Again, in other alternative approaches non-linear or statistical techniques may be used as an equivalent to the above described use of a threshold (for example a threshold may be expressed as a probabilistic criterion), and references to a threshold are intended to encompass these alternatives.

The skilled person will appreciate that such a colour re-mapping procedure may be employed independently of whether or not user filter processing and distortion correction processing is employed. Thus, for example, such colour re-mapping may be used to improve the appearance of the output data from whiteboard capture procedures other than the preferred procedure described above.

Optionally an icon such as a pen (and/or eraser) icon may be included in the output data to indicate to a viewer where writing/drawing is taking place (being added and/or erased).

In some preferred implementations of the method the output writing/drawing data is continuously (that is, successively) updated to provide a dynamic capture of the writing or drawing on the whiteboard. It will be appreciated that embodiments of the above described user filter processing, whilst removing the user from the image leave the writing/drawing on the whiteboard. Moreover this is performed in such a manner that if parts of the writing drawing are erased they also appear as erased in the output of writing/drawing data.

In one embodiment of the method (and below-described system) the writing/drawing data is output in a form which simulates or emulates data from a camera such as a webcam. In this way the output data may be provided to a video conferencing system, Skype™ system or the like without the need to modify the system to which it is retrofitted. In embodiments the writing/drawing data may be arranged to conform to a standard corresponding to a camera data format standard, for example a UVC (USB video class) standard.

Additionally or alternatively embodiments of the method (and below-described system) may output the writing/drawing data in a screenshare data format standard such as the Skype™ standard. To implement such an approach the software may include, for example, a Skype™ server or an implementation of the Skype™ screenshare protocol. In this way the writing/drawing data may be provided in a form which simulates or emulates data from a screenshare device. In this way embodiments of the method/system may straightforwardly interface with screenshare devices/systems.

Again the skilled person will appreciate that this approach of arranging the output data to simulate a camera may be applied to other whiteboard image capture systems as well as to that described above. Applications of this technique are therefore not restricted to systems which employ user filter processing and/or distortion correction processing as we have previously described.

The output writing/drawing data defines an image comprising the writing/drawing on the whiteboard, but it need not necessarily be in the form of a raster graphics image. In particular embodiments of the method provide writing/drawing data in the form of vector graphics data additionally or alternatively to raster graphics data; in preferred embodiments time-indexed vector graphics data. The use of time-indexed vector data is advantageous as it facilitates post-processing such as handwriting recognition, which typically relies upon the evolution in time of the writing to achieve high accuracy. Whether or not such post-processing is employed, vector graphics have the advantages of being 'resolutionless', that is they can be rendered at a wide variety of scales whilst retaining clarity.

The use of vector graphics also facilitates additional image processing to effectively improve the resolution of the image capture device. The image capture device will typically provide a raster image and the vector graphics data may be generated by locating the positions of the start and/or end of stroke segments of the writing/drawing (in embodiments using blockwise processing of the image). While employing such an approach the location of the start and/or end of a stroke segment of the writing/drawing can be located to better than the pixel resolution of the image capture device (camera) by combining the data from multiple pixels, for example by centroiding. Such an approach can provide improved resolution output data or, alternatively, may be used to facilitate the use of a lower resolution camera or lens at the input, thus reducing cost.

In embodiments of the method/system the use of a reduced cost/specification processor may be facilitated in other ways. For example some frames, such as designated or selected key frames, may be processed at a relatively higher resolution and other frames, for example the remaining frames, may be processed at a relatively lower resolution.

As the skilled person will appreciate, when outputting vector data information which is included with or mapped to the vector data need not be limited to colour data and may also include one or more of: stroke timing data, stroke speed, stroke thickness, and the like.

The output writing/drawing data may also include metadata, for example data identifying the user of a pen and/or associated audio data. There are various ways in which such metadata may be obtained—for example different users may have different pens which are distinguishable to the system/method, for example by their colour or a pen identifier such as an optical or RF identifier. Alternatively handwriting recognition may be employed.

As previously mentioned, the use of vector data, in particular time-indexed vector data, is particularly advantageous for handwriting recognition. However it will be appreciated that the use of handwriting recognition is not restricted to vector data and may also be applied to raster data. Whichever type of data is employed optionally the output data may be post-processed to recognise the handwriting of a user and, more particularly, to distinguish between the handwriting of different users. This information may then be included as metadata with the output writing/drawing data. This provides an example of the way in which the metadata may define who produced a particular writing/drawing or part of a writing/drawing. Other examples include relying on pen colour and/or a pen identifier, as described above. As the skilled person will appreciate such information may be stored, indexed and the like to enable search/retrieval later, for example to identity all the content produced by an identified user.

Optionally users multiple users may be tracked simultaneously. For example multiple different pens may be tracked simultaneously and/or the arms/hands of multiple users may be tracked simultaneously as they write. In this way embodiments of the system/method may provide metadata allowing the writing/drawing of multiple simultaneous users to be identified.

As previously mentioned, in embodiments audio data may be captured in combination with the captured images and provided in combination with the output writing/drawing data, preferably synchronised with this data. Such an approach can, for example, facilitate subsequent replay of the captured audio data associated with a particular part of the writing/drawing. Optionally directional audio recording may be employed. For example by recording synchronised audio in stereo embodiments of the system are able to identify, for example, when multiple people are writing on the board while speaking, and may distinguish what of those users is saying as they write. This may be assisted by knowledge, for example from the camera images, of the locations of the users. Such knowledge simplifies the application of phased array and other multiple microphone techniques to selectively capture audio from a particular source and/or process the stereo audio after capture to select the audio from a particular speaker.

Again the skilled person will appreciate that the provision of a captured whiteboard data in combination with metadata as described above may be employed with whiteboard capture systems other than those using the particular type of user filter processing and/or distortion correction previously described. Thus aspects of the invention contemplate the use of such techniques independently of the previously described aspects and embodiments of the invention.

In still further aspects/embodiments of the invention a method/system is provided in which writing/drawing data is captured and in which the image capture device, in particular the camera, is also employed to provide commands to the method/system. Such commands may take many forms—for example gesture processing may be employed to enable the method/system to be commanded by user gestures.

Additionally or alternatively a portion of the image capture region may be designated as a command portion—for example a lower corner of the whiteboard or an image region outside the whiteboard region (but still within the region viewed by the camera). With such an approach a command may be given by writing or drawing in a designated region of the whiteboard, for example writing 'print' or 'store' or drawing a corresponding symbol. Such an approach is not necessarily limited to use in a designated region of the input area/whiteboard—for example a command symbol may be identified no matter where it occurs within the captured image. In a still further alternative approach a template may be attached to the whiteboard or other surface with command regions which the user touches to activate a command. For example a label may be provided with one or more commands, such as print, store and the like, on command buttons/regions. The method/system may then identify when the user touches the relevant command button/region.

Other aspects of the system may also be automated. For example the keystone correction may either be employed based on a defined location of the camera or the keystone correction (projective transform) may be determined from the distorted captured image. This may be achieved by, for example, identifying the corners of the whiteboard. This provides four points in the captured image which may then be transformed into four points lying at the orders of a rectangle in the corrected image. Once four matching points are identified in the input and corrected image this is sufficient to establish the projected transform. The corners of the whiteboard or similar may be identified by routine image processing, for example by following the contours of the edge of the board (which provide a relatively strong feature in a captured image). Once the edges have been located their intersections may be computed to determine the corner locations. In a still further approach a user may be requested to click on the corners of the whiteboard in a captured image to identify these locations.

An alternative to relying on detecting the corners of the board uses a projected image or pattern. This can be employed to define the extent of a usable board region, and can thereby provide a form of auto-calibration. This may be achieved by combining a low cost laser diode with a DOE (diffractive optical element) to define a rectangle or pattern of four spots, preferably which is adapted to the field of view of the camera (at the position at which the camera is mounted).

Optionally the resolution of the system may be optimised to suit the board by providing a number of simple mechanical pre-set positions which match the size of common boards. In embodiments a mount or boom for the camera may be provided which allows the camera to be mounted at different positions with respect to the board—for example the mount may be telescopic or have preset camera mounting locations along its length. Thus in embodiments the camera may be located at one of a set of predetermined positions, more particularly distances from the board. The mount may be marked to identify the corresponding board sizes, for example 130", 80", 60" diagonal, and so forth. Alternatively the mount may permit a substantially continuously variable camera position, in which case the camera positions may be provided with a corresponding scale calibrated in terms of the whiteboard size corresponding to the positions, for example in the form of a suitably marked ruler.

The invention further provides processor control code to implement the above-described methods, for example on a general purpose computer system, on a digital signal processor (DSP), on a server, for example in the cloud, or on the image capture device (camera) itself. The code is provided on a non-transitory physical data carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code, or code for a hardware description language. As the skilled person will appreciate such code and/or data may be distributed between a plurality of coupled components in communication with one another.

In a related aspect the invention provides whiteboard sharing apparatus comprising: a camera to be directed to capture an image from a whiteboard; and signal processing apparatus, coupled to said camera and configured to: input camera data for a succession of image frames, wherein said camera data is from a camera directed towards said whiteboard and said image frames comprise successive images of said whiteboard from said camera user filter process data from said image frames to remove parts of said image frames corresponding to parts of a user or user pen writing or drawing on said whiteboard; wherein said user filter processing comprises filtering to distinguish between motion of said user/user pen parts in said image frames and writing/drawing image information in said image frames which appears or changes during said writing or drawing but which is thereafter substantially unchanging; and output writing/drawing data from said user filter processing, wherein said writing/drawing data defines captured writing or drawing on said whiteboard As the skilled person will appreciate the signal processing apparatus may be configured to implement some or all of the features of the previously described aspects and embodiments of the invention, including those which may be employed independently of the user filter processing and distortion correction processing we have described.

Suppression of Reflections

To capture whiteboard content with a camera while minimising occlusion from users, it is desirable to use wide-angle optics and image the board at an acute angle. However, such a configuration makes the resultant images susceptible to environmental specular reflections, typically from the floor and from objects to the sides of the board (such as windows or walls). This problem is exacerbated by the fact that whiteboard surfaces tend to be quite glossy. Image processing techniques can be used to reduce this problem to some extent, but tend to compromise image fidelity in the process.

The use of polarisers to reduce reflections is common in the art. Specular reflections of objects from a surface at or close to Brewster's angle are strongly linear polarised, and so can be effectively removed using a linear polariser (at the expense of 50% light loss elsewhere, assuming the board illumination is unpolarised). Polarisers are commonly used in photography and other optical applications. However in these usages, the polariser is always flat and mounted on the camera lens perpendicular to the optical axis of the lens.

For the whiteboard capture application, the extreme acute angle imaging geometry means that the "correct" linear polarisation to optimally suppress reflections varies significantly with angle. As a result, a standard linear polariser is not effective at reducing reflections from the board.

According to an aspect of the invention there is therefore provided A whiteboard image capture system, the system comprising: a camera configured to capture an image of a whiteboard viewed from an acute angle; and a linear polariser having a plane substantially perpendicular to a plane of said whiteboard and having an axis of polarisation substantially perpendicular to the plane of the whiteboard or within 30° of the perpendicular to the plane of the whiteboard; wherein said camera is configured to capture said image of the whiteboard through said polariser; and wherein a normal to said polariser is directed in a different direction to a direction defined by an optic axis of said camera.

In preferred embodiments the camera has a rectilinear lens. Thus in embodiments the for example rectangular surface of the whiteboard is mapped to a corresponding rectangular image on the sensor of the camera, preserving a substantially linear relationship between positions on the whiteboard and positions on the camera sensor.

In some preferred embodiments the camera lens has a field of view of greater than 140°, 150°, 160°. In embodiments even though the camera is viewing the whiteboard surface at an acute angle (to a plane of the surface)—that is it has an acute angle of observation of the surface—the optical axis of the camera is directed towards the whiteboard at an angle close to a normal to the surface (at an acute angle to a normal to the surface). Although an acute angle is an angle of less than 90°, as used herein the acute angles which are referred to are preferably angles of less than 45° or less than 30°.

In principle, if the field of view were large enough, the optical axis of the camera could be directed normal to the whiteboard. In practice it is typically at an angle in the range one to three degrees to the normal to the whiteboard surface, and though larger angles may be employed, beyond around 10° the image suffers. Thus in embodiments the optic axis of the camera is directed towards the whiteboard at an angle of less than 15° to a normal to a surface of the whiteboard, more preferably at an angle of between 12° and 0.5° to a normal to a surface of the whiteboard.

In some preferred embodiments the polariser (which is placed in front of the camera lens) is curved about an axis perpendicular to the plane of the whiteboard. This curvature in embodiments optimises the suppression of the reflected component at the corresponding position on the board. Therefore embodiments of this aspect of the invention are able to provide a significant decrease in the amplitude of reflections in the recorded image, and a corresponding increase in captured image fidelity.

In embodiments the camera is located laterally adjacent an upper (or lower) edge of the whiteboard and is displaced vertically away from the plane of the whiteboard; the camera may be mounted approximately at a mid-point of the upper (or lower) edge. In embodiments the angle of observation of the camera is directed towards the whiteboard at an acute angle of less than 60°, 45°, or 30°. However in embodiments the optic axis of the camera is directed to miss or just intersect said edge of said whiteboard—that is, although the camera looks at the whiteboard at an acute angle the optic axis of the camera may miss the whiteboard. In embodiments the polariser is located at a greater distance from the camera (measured laterally, in the plane of the whiteboard) than a location defined by an intersection of the optic axis of the camera with a plane defined by a surface of the whiteboard.

The skilled person will appreciate that these optical techniques may be combined with the data processing and other techniques described herein.

The skilled person will appreciate that a system or method as described above may also be employed to capture an image from a surface other than a whiteboard.

Thus in a related aspect the invention provides an image capture method, the method comprising: capturing an image of a surface using a camera viewing the surface at an acute angle to the surface and having an optical axis directed towards said surface at an angle of less than 15° to a normal to the surface; arranging a linear polariser at a location laterally between an intersection of the optic axis of the camera with a plane defined by said surface and a portion of said surface viewed by the camera; arranging said linear polariser to be generally perpendicular to a plane of said surface; aligning an axis of polarisation of said polariser generally perpendicular to the plane of the surface; and capturing said image using a said camera viewing through said linear polariser.

The invention further provides means for implementing such a method.

The invention also provides whiteboard sharing apparatus comprising: a camera to be directed to capture an image from a whiteboard; and signal processing apparatus, coupled to said camera and configured to: input camera data for a succession of image frames, wherein said camera data is from a camera directed towards said whiteboard and said image frames comprise successive images of said whiteboard from said camera filter data from said image frames to remove parts of said image frames corresponding to parts of a user or user pen writing or drawing on said whiteboard; and output writing/drawing data from said user filter processing, wherein said writing/drawing data defines captured writing or drawing on said whiteboard; and a polariser having a plane substantially perpendicular to a plane of said whiteboard.

The invention further provides a whiteboard image capture system, the system comprising: a camera with a rectilinear lens configured to capture an image of the whiteboard viewed from an acute angle; and wherein said camera is located laterally adjacent an upper or lower edge of said whiteboard and is displaced vertically away from the plane of the whiteboard; and wherein an optic axis of said camera is directed towards said whiteboard at an angle of less than 15° to a normal to a surface of the whiteboard.

BRIEF DESCRIPTION OF THE DRAWINGS

These and other aspects of the invention will now be further described by way of example only, with reference to the accompanying Figures, wherein like numerals refer to like parts throughout, and in which:

FIGS. 2a to 2c show block diagrams of examples of data capture, processing and sharing systems according to embodiments of the present invention;

DETAILED DESCRIPTION OF PREFERRED EMBODIMENTS

Figure 1A:
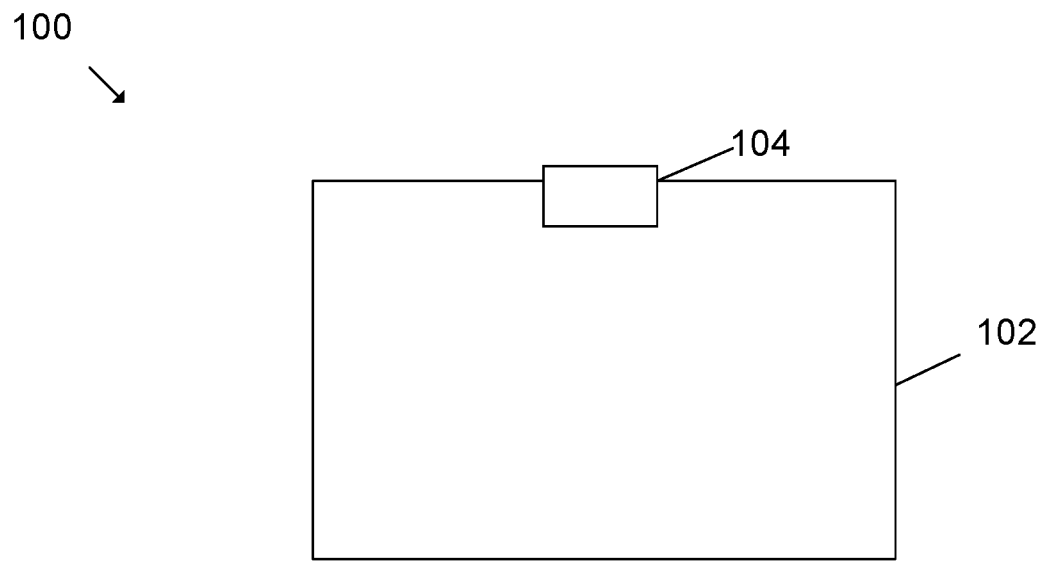
FIGS. 1a and 1b show schematic front and side views of a data capture and sharing system according to embodiments of the present invention.

FIG. 1a shows a schematic front view of a data capture and sharing system 100 generally as described herein.

The data capture and sharing system 100 has, in this example, a 60 inch whiteboard 102 and a camera 104. Camera 104 is, in this example, an acute angle camera 104, with a resolution of 1920×1440. Camera 104 connects to a power source (not shown).

Figure 1B:
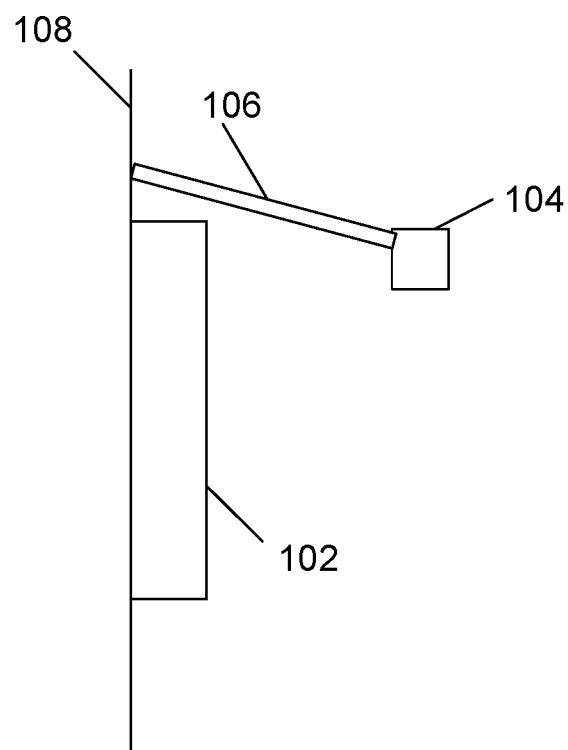

FIG. 1b shows a schematic side view of the data capture and sharing system 100 including whiteboard 102 and camera 104. Whiteboard 102 is mounted at a wall 108. The camera is, in this example, mounted via support 106 on wall 108. It will be appreciated that this is merely an exemplary configuration of whiteboard 102 and camera 104, and various alternative configurations may be exploited in which whiteboard 102 is located in the field of view of camera 104.

Figure 2A:
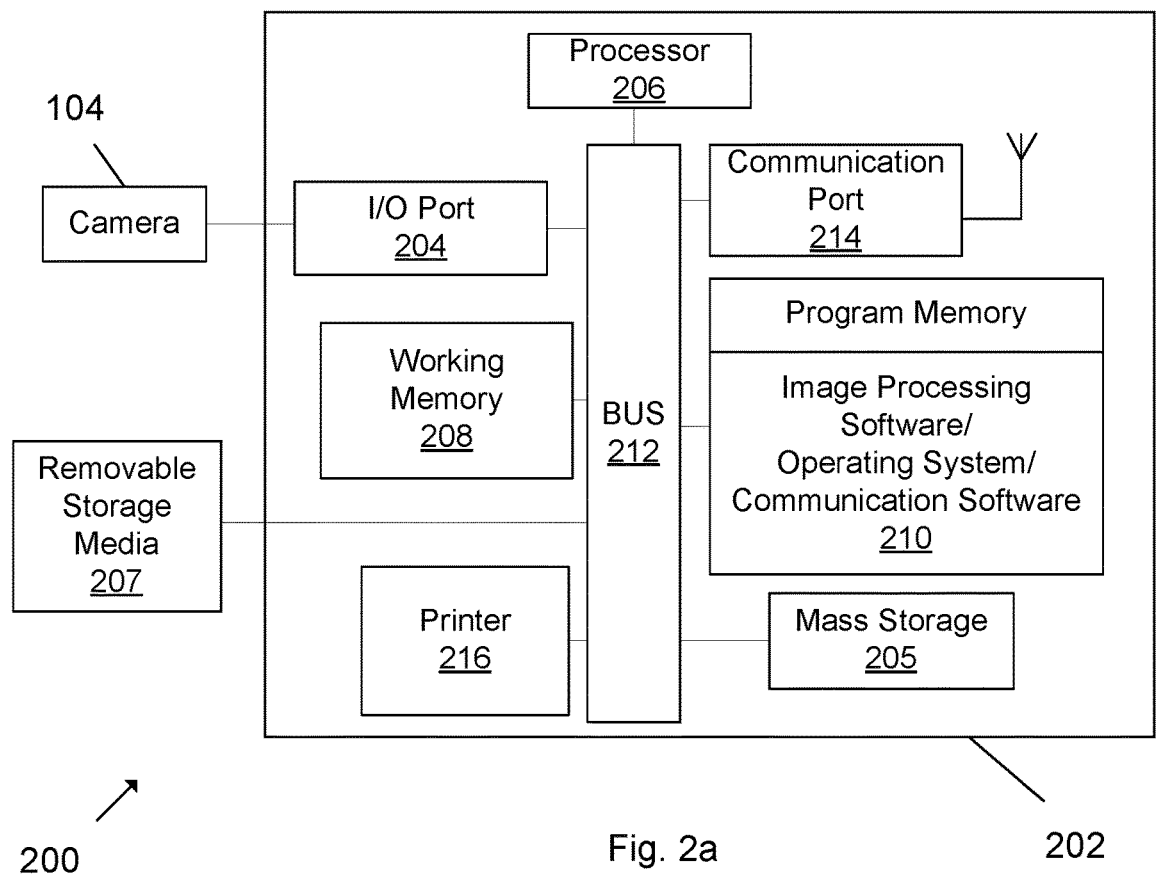

FIG. 2a shows a block diagram of an example data capture, processing and sharing system 200.

Data capture, processing and sharing system 200 comprises a computer system 202. Various components of the computer system 202 are connected to a bus 212 of computer system 202. In this example, an input/output port 204 is connected to both of bus 212 and camera 104, respectively. According to the present example, the computer system 202 further comprises a processor 206, a communication port 214, a program memory with image processing software, operating system and communication software 210, a mass storage 205, a working memory 208 and a printer 216. Furthermore, in this example, a removable storage media 207 is connected to bus 212. Bus 212 therefore communicatively couples the various components of the computer system 202

Figure 2B:
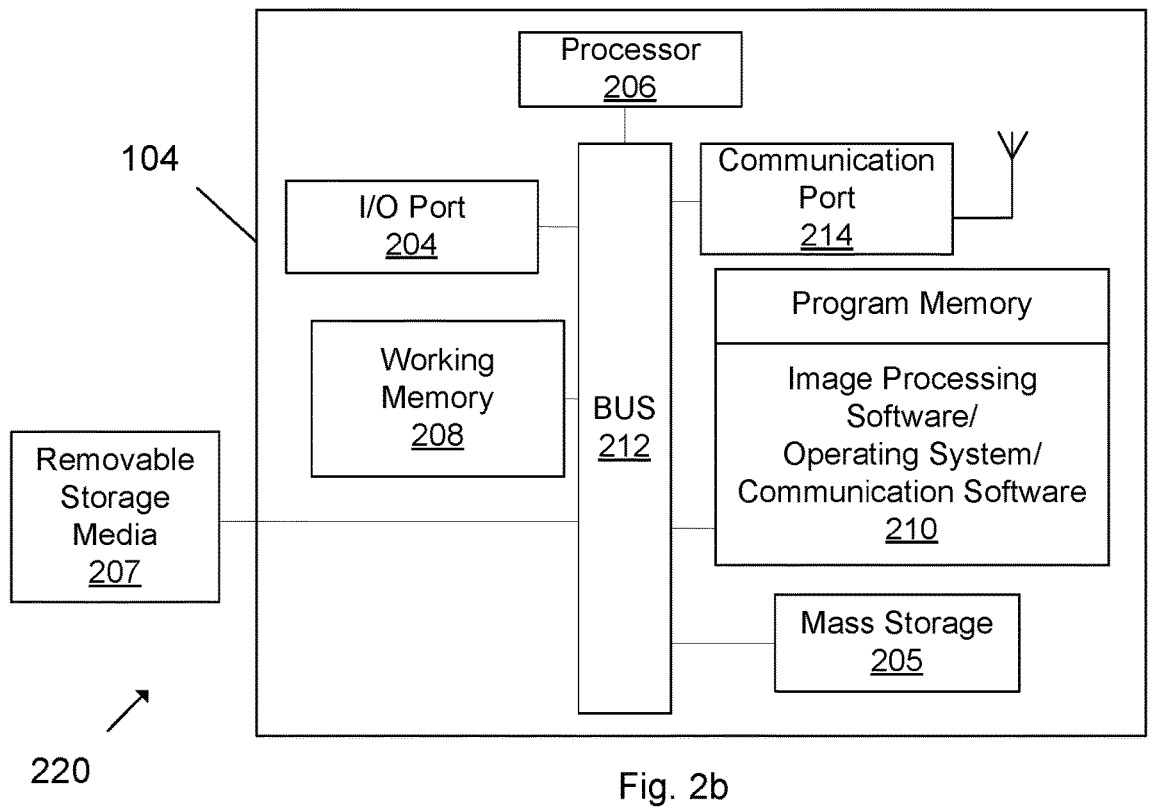

FIG. 2b shows a block diagram of a further example data capture, processing and sharing system 220.

In the data capture, processing and sharing system 220, various components of the computer system are integral to camera 104. Therefore, camera 104 comprises a processor 206, a communication port 214, program memory with image processing software, operating system and communication software 210, mass storage 205, input/output port 204, and working memory 208. Bus 212 connects the various components of the computer system within camera 104. A printer 216 and a removable storage media 207, respectively, may be connected to bus 212.

In the data capture, processing and sharing systems of FIGS. 2a and 2b, the communication port 214 comprises, in this example, a WiFi communication link. Alternative communication links, such as Bluetooth®, or other links may additionally or alternatively be used.

Generally, camera 104 captures an image, which is then processed using computer system 202 or a computer system integral to camera 104, respectively. The processed and updated image may then be transmitted to external devices via communication port 214.

FIG. 2c shows a block diagram of a further example of a data capture, processing and sharing system 240. In this example, camera 104 is connected to a cloud ("Internet") via, in this example, a WiFi communication link. The signal transmitted via the communication link connected to camera 104 is received at a communication link which is connected to, in this example, a WiFi connection point 218. WiFi connection point 218 itself is connected to the cloud. In this example, a personal computer 224 and a server 222, respectively, are in bidirectional communication with the cloud. In this example, the image captured by camera 104 may be processed via devices (e.g. PC 224) connected to the cloud, and stored in the cloud and/or shared with external devices which access the cloud.

Figure 3A:
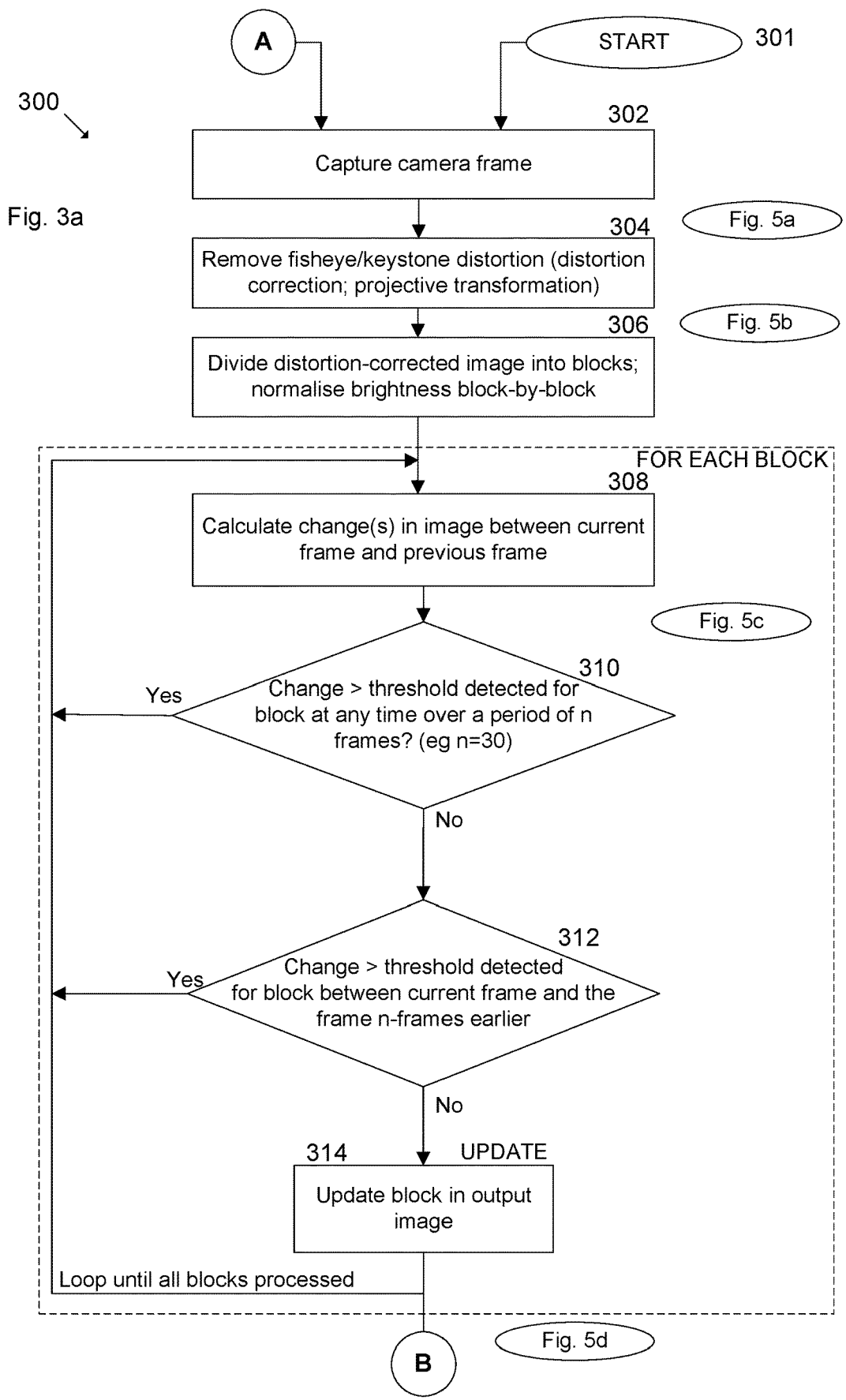
FIGS. 3a and 3b show flow charts of steps of data capture, processing and sharing according to embodiments of the present invention.
Figure 3B:
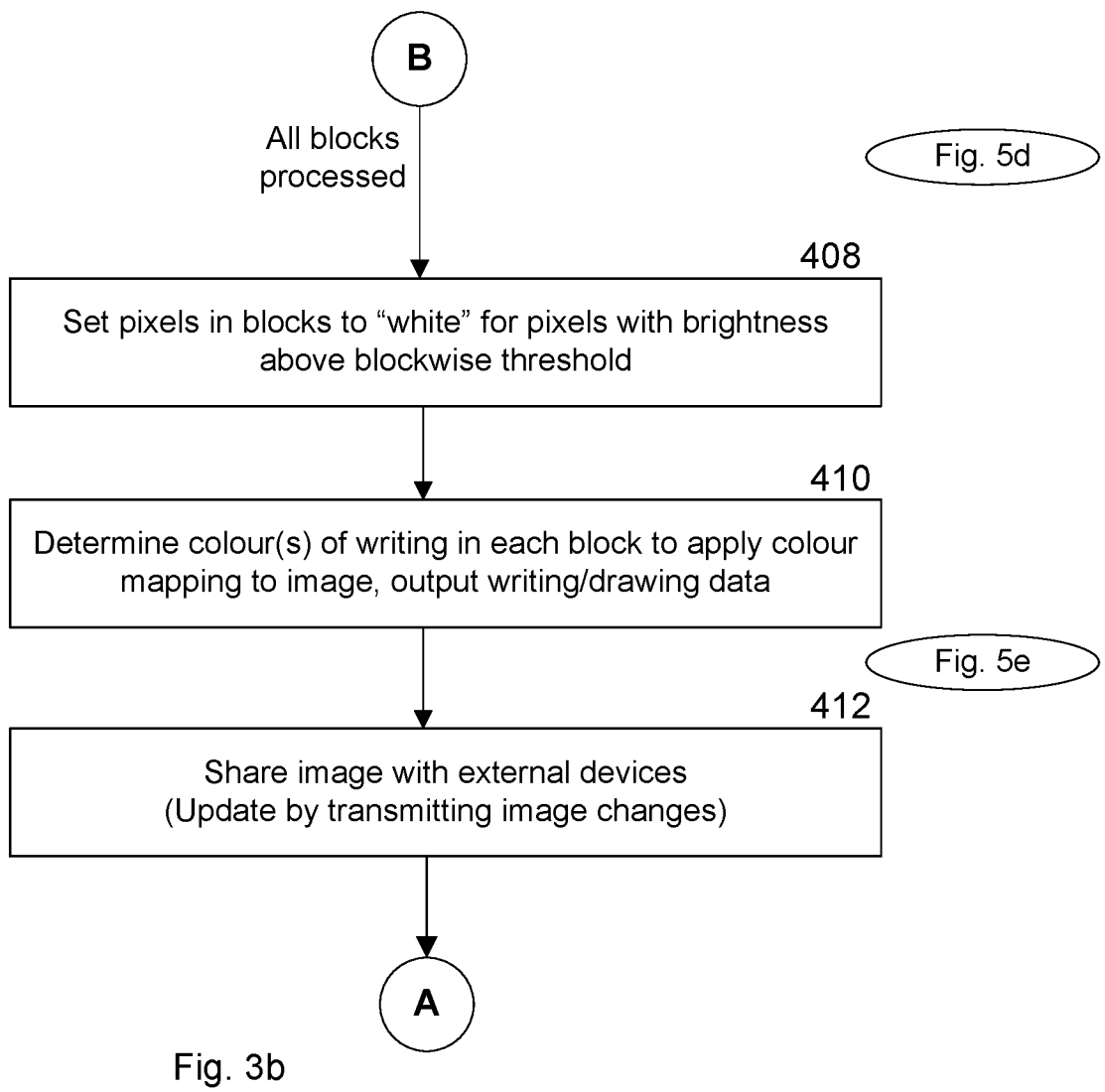

FIGS. 3a and 3b show flow charts of the steps of data capture and processing according to embodiments of the present invention.

In FIG. 3a, "START" 301 specifies a starting point at which the data capture, processing and sharing is performed.

At step 302, a camera frame of the whiteboard 102 is captured. An image captured with camera 104 is shown in FIG. 5a.

Figure 5A:
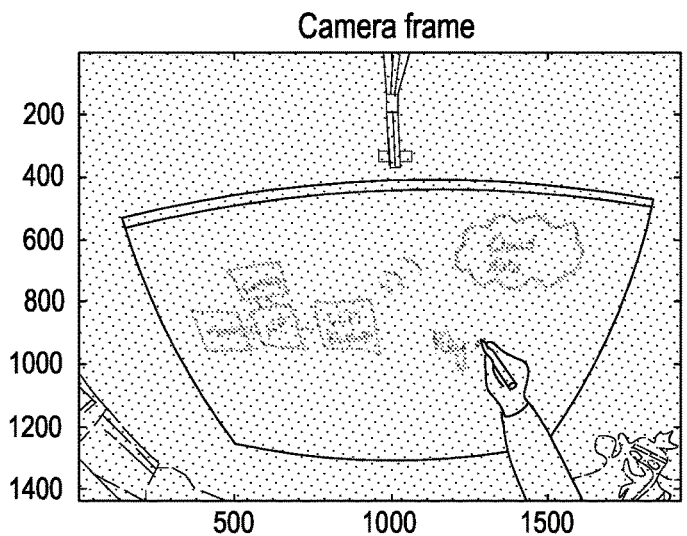
FIGS. 5a to 5e show images at the various steps of data capture, processing and sharing of FIGS. 3a, 3b and 4 according to embodiments of the present invention.

Fisheye and/or keystone distortion as shown in the captured image in FIG. 5a is then removed by applying distortion correction and/or a projective transform at step 304. In some preferred embodiments of the method the processing described below is performed on a monochrome version of the captured image data and colour is added back afterwards.

In one embodiment the projective transform is determined from four coordinates and the points they map to, preferably corners of the whiteboard 102. The corners of the whiteboard 102 can be determined manually (e.g. from user clicks on an image) or automatically, for example by identifying edges of the whiteboard 102 and where they intersect. If the size of the whiteboard 102 is known the transform can be completely determined; if the size is unknown the transform can be determined to within a scaling ambiguity, which need not matter in a practical implementation.

The projective transform maps 2D object plane points (x, y) to 2D image plane points (u,v). If there are two images corresponding to different camera angles then an 8-parameter transform maps (x, y) points in one image to (υ,v) points in the other:

$$u = \frac{ax+by+c}{gx+hy+1}, v = \frac{dx+ey+f}{gx+hy+1}$$

These can be rearranged as:

$$ax_i+by_i+c=gx_iu_i+hy_iu_i+u_i$$

$$dx_i+ey_i+f=gx_iv_i+hy_iv_i+v_i$$

and solved if 4 points are known (8 knowns, 8 unknowns), by multiplying both sides of the equation below by the pseudo-inverse of the large matrix of coordinate terms:

$$\begin{bmatrix} x_0 & y_0 & 1 & 0 & 0 & 0 & -x_0u_0 & -y_0u_0 \\ 0 & 0 & 0 & x_0 & y_0 & 1 & -x_0v_0 & -y_0v_0 \\ x_1 & y_1 & 1 & 0 & 0 & 0 & -x_1u_1 & -y_1u_1 \\ 0 & 0 & 0 & x_1 & y_1 & 1 & -x_1v_1 & -y_1v_1 \\ \vdots & & & & & & \vdots & \vdots \\ x_{n-1} & y_{n-1} & 1 & 0 & 0 & 0 & -x_{n-1}u_{n-1} & -y_{n-1}u_{n-1} \\ 0 & 0 & 0 & x_{n-1} & y_{n-1} & 1 & -x_{n-1}v_{n-1} & -y_{n-1}v_{n-1} \end{bmatrix} \begin{bmatrix} a \\ b \\ c \\ d \\ e \\ f \\ g \\ h \end{bmatrix} = \begin{bmatrix} u_0 \\ v_0 \\ u_1 \\ v_1 \\ \vdots \\ u_{n-1} \\ v_{n-1} \end{bmatrix}$$

The lens distortion may be corrected by using distortion parameters $K_1$, $K_2$, $K_3$ in the equations below, where $(x_p, y_p)$ are the coordinates of the lens axis (the distortion parameters may be obtained from manufacturer's data, or from a computer aided optical design program, or via a calibration procedure):

$$r^2 = (x-x_p)^2 + (y-y_p)^2$$

$$\delta_r = ((K_3r^2+K_2)r^2+K_1)r^2$$

$$x_1 = x(1+\delta_r)$$

$$y_1 = y(1+\delta_4)$$

Figure 5B:
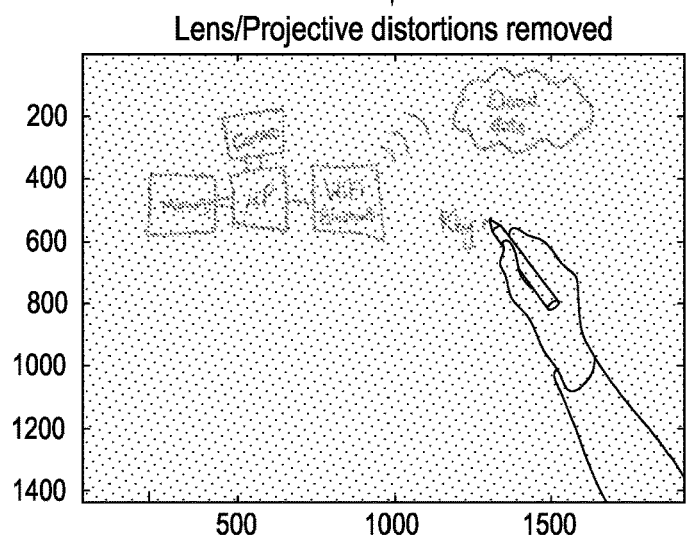

A result of the distortion-corrected image is shown in FIG. 5b.

The skilled person will appreciate that the order in which certain steps of embodiments of the methods are performed may be changed without departing from the general concept of the image capture, processing and sharing described herein. For example, the fisheye/keystone corrections may be removed at a later stage of the processing, for example at a step before sharing an updated image with external devices.

Once fisheye and/or keystone distortion have been removed at step 304, the distortion-corrected image is divided into blocks at step 306. In this example, the image is divided into 40×40 blocks. Furthermore, in this example, each block comprises 48×36 pixels. The width of a pen stroke on the whiteboard 102 is, in this example, 7-8 pixels wide.

The processing performed for each block is indicated by the dashed line in FIG. 3a. In the illustrated example this is performed sequentially, block by block, but the skilled person will appreciate that additionally some or all of the block processing may be performed in parallel.

Preferably a block-by-block normalisation is performed, selecting a normalisation value for a block based upon the pixel values in that block. This may be performed prior to the user filter processing as previously described, or may be performed in conjunction with the user filter processing, for example as part of a loop checking for changes in the blocks.

It is desired to remove any body parts from the captured image prior to sharing an updated image with external devices. The following steps outline a procedure to show how body parts of the person writing on the whiteboard 102 may be distinguished from features which are written in the board and background effects due to, e.g. shadowing or reflections.

Processing steps shown within the dashed box in FIG. 3a are performed for each block. At step 308, (a) change(s) in the image for a block between the current frame and the previous frame are calculated. In this example, a frame is 1/30 second long. If at step 310 a change which is larger than a threshold is detected for a block at any time over a period of n frames, the process returns to step 308. In this example, n=30. If however, no change above a threshold is detected for a block at any time over a period of n frames, a further calculation is performed at step 312. If a change larger than a threshold is detected for a block between the current frame and the frame n-frames earlier, the process returns to step 308. If, however, no change above a threshold is detected for a block between the current frame and the frame n-frames earlier, the block is updated in the output image at step 314.

Figure 5C:
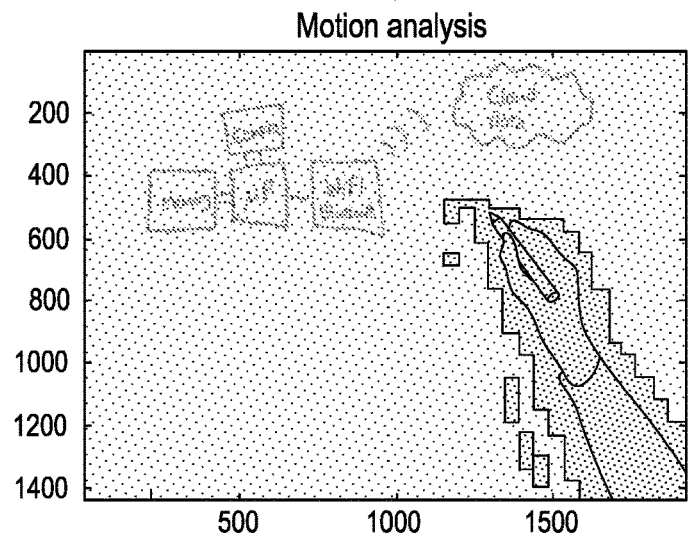

The resulting image is shown in FIG. 5c (artificially coloured), in which green colours identify blocks which have been stable for the longest period. As can be seen in the image of FIG. 5c, the person is continuously moving his arm over the whiteboard 102 while writing (pink colours), whereas blocks with writing appears less pink. Blocks without writing at which no body parts have been detected appear the greenest.

Generally, time constants may be assigned to each of the person writing on the whiteboard 102, the writing itself, as well as any background due to, e.g. shadowing or reflections on the whiteboard 102. A person writing on the whiteboard 102 is assigned a time constant which is shorter than that of the writing on the whiteboard 102. This is because the person writing on the whiteboard 102 will move his arm once he has written on the whiteboard 102. In this example, the writing itself has a time constant which is shorter than that of any background on the whiteboard 102. Therefore, a block may not be updated if a person's body part moves due to the detection at step 310. Only blocks which are stationary, in this example, for a time equal or greater than 1 second, may be updated.

The potential issue of a person moving his body parts very slowly over the whiteboard 102 is addressed at step 312. If a person moves his arm slowly over the whiteboard 102, there may be a "no" result at step 310, i.e. there is no change above a threshold within, in this example, 1 second. However, the block will be compared for a current frame to a frame n-frames earlier at step 312. Therefore, if the person moves his arm further with a slow motion, this can be detected at step 312, resulting in the processing going back to step 308.

Figure 5D:
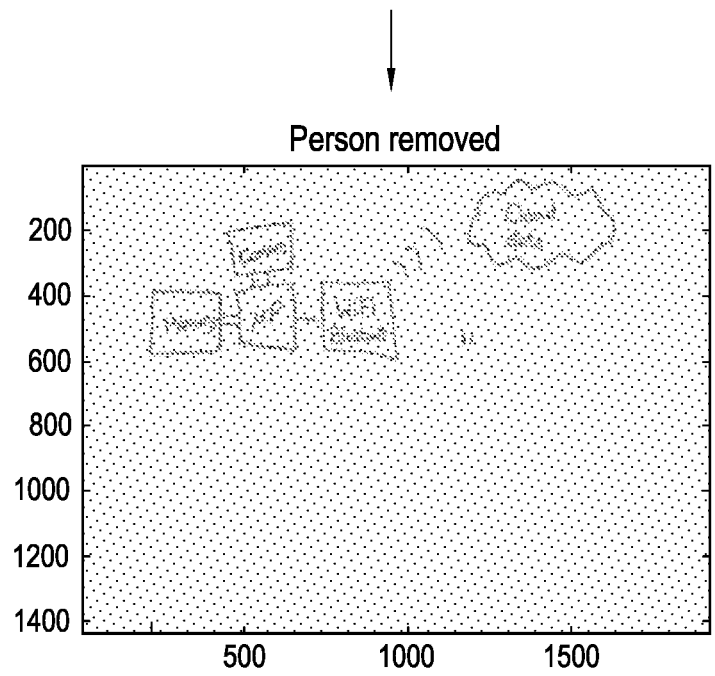

The process steps from step 308 to step 314 are looped until all blocks have been processed. The blocks for which there have been "no" results at steps 310 and 312 will be updated in the output image. An example result is shown in FIG. 5d.

It is now desirable, once the person has been removed from the image, to "clean up" the image further, e.g. by removing any shadowing and/or reflections, and determining the colour(s) of the writing on the whiteboard 102.

Therefore, following from point "B" of FIG. 3a, FIG. 3b shows the steps performed once all blocks have been processed.

At step 408, pixels in blocks with a brightness above a threshold are set to "white". In this example, a maximum brightness is pre-determined, and any pixels with a brightness above 80% of the maximum brightness are set to "white". This allows, e.g. removing reflection on the whiteboard 102, which appear brighter than any writing on the whiteboard 102.

At step 410, the colour(s) of writing in each block is determined in order to apply a colour mapping to the image, so as to output writing/drawing data. The mean colour is thereby analysed for the pen ink on a block by block basis. The mean colour determined for each block is then mapped onto a colour code and output in the output image. This advantageously allows for mapping the pen colours onto computer-generated colour even where the colours are unsaturated in the camera image.

Figure 5E:
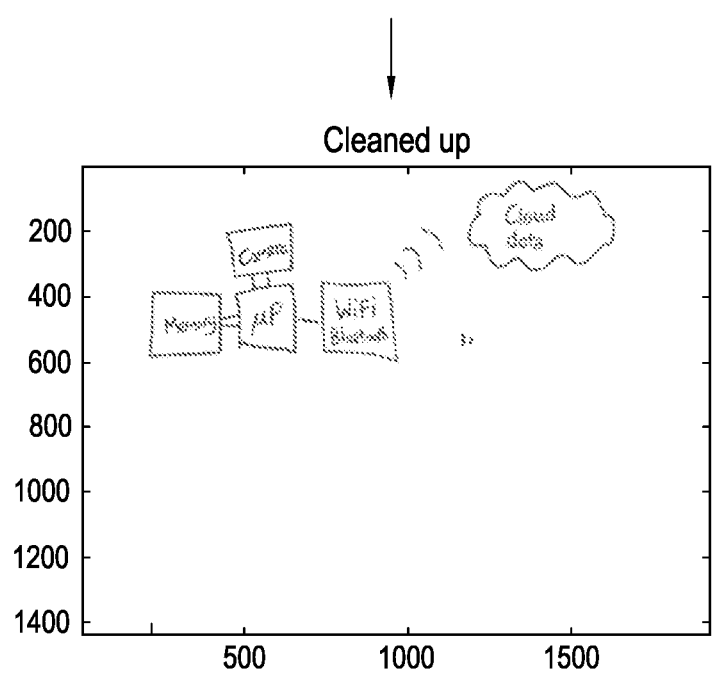

The result of applying steps 408 and 410 is shown in FIG. 5e.

At step 412, the image may then be shared with external devices as outlined above with regard to FIGS. 2a to 2c. Advantageously, only data for updated blocks in the output image are sent to external devices. Therefore, the bandwidth may be advantageously improved using the data capture, processing and sharing method described herein.

The process outlined above from step 301 to step 412 is looped as shown in FIG. 3b, whereby at point "A", the process starts over at step 302. The capturing, processing and sharing is therefore a continuous loop process.

Figure 4:
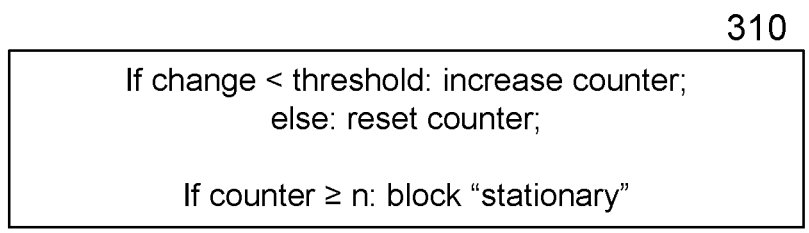
FIG. 4 shows a processing step of the image processing according to embodiments of the present invention.

FIG. 4 outlines details of processing step 310 shown in FIG. 3a.

In this example, if a change is less than a threshold (or, as will be understood, no change is detected in a block at all), a counter is increased. If, on the other hand, a change is detected which is above the threshold, the counter is reset.

Once the counter reaches, in this example, n=30, it is determined that the block is "stationary". The process then continues from step 310, at which this determination is made, to step 312 for a further determination as outlined above.

Methods and systems described herein therefore allow real time streaming/sharing of content written on a whiteboard 102, whereby advantageously the person writing on the whiteboard 102 and any background (e.g. shadowing and/or reflections) on the whiteboard 102 are removed. It is therefore only the actual writing on the whiteboard 102 which may be shared with external devices via an image stream, or, in embodiments, via a vector stream (e.g. to use the systems and methods for handwriting recognition). In preferred embodiments only the changes in the output writing/drawing (raster or vector) data need be transmitted.

As outlined above, embodiments of the system provide one or more interfaces, e.g. to a printer. The system may be configured to print an image once a movement over a certain block has been detected. Alternatively or additionally, the camera 104 may be configured to identify gestures to determine what action the system should take. The analysis of a gesture may be used to, e.g. print an image. Alternatively or additionally, if a person writes, e.g. "printer" onto the whiteboard 102, the system is configured to print the current image. Similarly, an image may be stored by identifying a certain gesture or "print" written on the whiteboard 102.

In a further embodiment, a template may be provided on or next to the whiteboard 102. The template may have "buttons" (in the form, for example, of pre-defined or pre-printed areas) which the user may press. If the camera detects that the user has moved over, or drawn on, a corresponding block, this may be used to perform actions, such as printing and/or storing an image.

A time stamp may be added to images. An audio signal may simultaneously be recorded during a writing session on the whiteboard 102. This may allow for mapping audio signals to one or more captured, processed and shared images. Additionally or alternatively, a video sequence may be prepared based on the captured, processed and shared images.

No doubt many other effective alternatives will occur to the skilled person. For example rather than employing a single camera the system could employ two or more cameras to help to achieve a wide field of view, stitching together the images from the cameras to provide a single, wide-field image.

Suppression of Reflections

Referring again to FIG. 1, consider a camera directed towards the whiteboard and positioned just above its top edge. The reflections off the board are polarised, but polarised with regard to the plane of the board, not the optical axis of the camera.

Figure 6A:
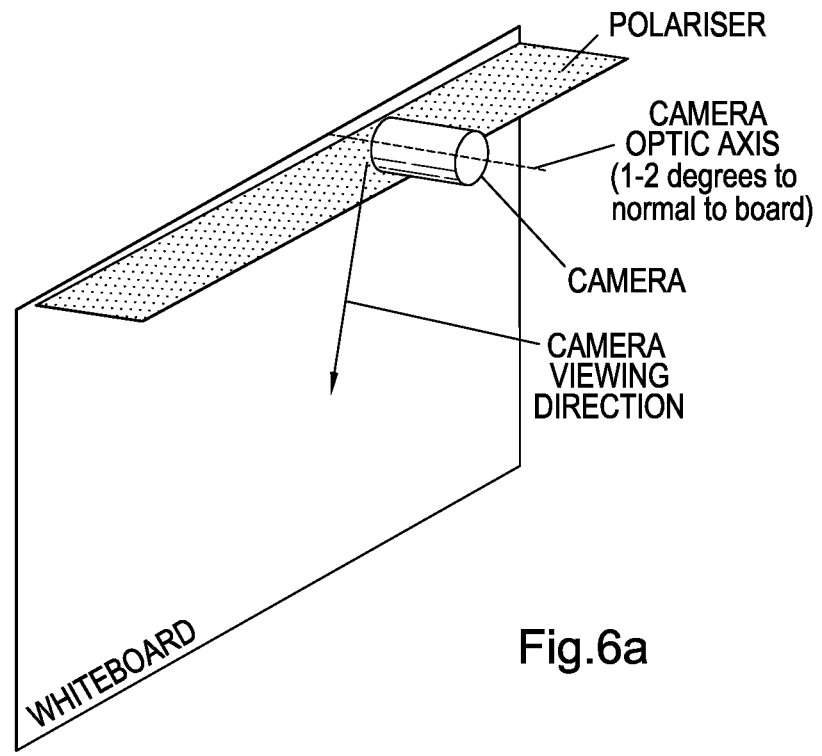
FIGS. 6a and 6b show schematic views of a data capture and sharing system incorporating, respectively, a flat polariser and a curved polariser, according to embodiments of aspects of the present invention.

To reduce these reflections a linear polariser may be orientated approximately perpendicular to the board (with the electric vector axis of polarisation also perpendicular to the board), as shown schematically in FIG. 6a. However this results in a large (polariser), extending across the (full) field of view of the camera, which typically has a wide-angle lens.

Figure 6B:
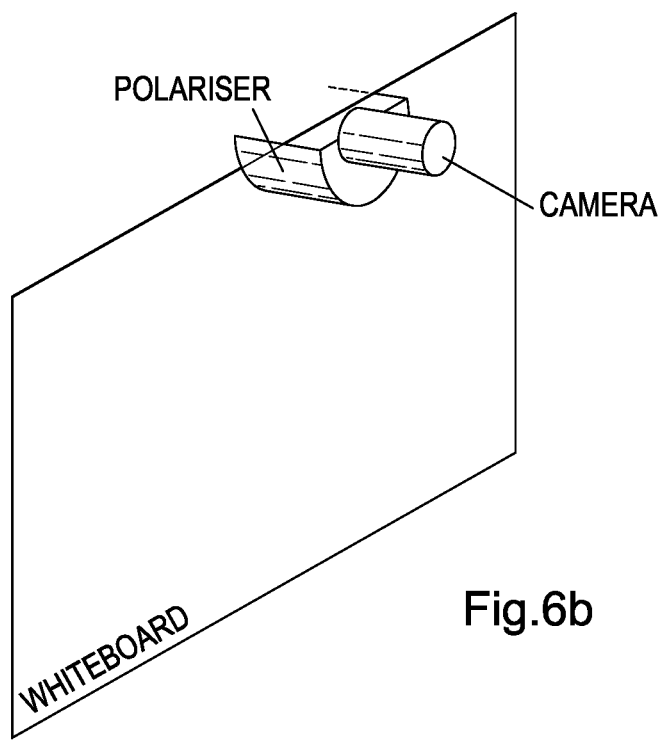

Therefore, as illustrated schematically in FIG. 6b, in embodiments the polariser is curved around the location of the camera, but nonetheless keeping it approximately perpendicular to the board (but not to the optical access of the camera). This reduces reflections but substantially reduces the size of the polariser needed.

Thus, in broad terms, a (tangential) plane of the polariser is at substantially all points substantially perpendicular to the whiteboard, but the curvature of the polariser enables a substantial reduction in its physical size.

It will be understood that the invention is not limited to the described embodiments and encompasses modifications apparent to those skilled in the art lying within the spirit and scope of the claims appended hereto.

The invention claimed is:

1. A method of capturing writing or drawing on a whiteboard, the method comprising:
  inputting camera data for a succession of image frames, wherein said camera data is from a camera directed towards said whiteboard and said image frames comprise successive images of said whiteboard from said camera;
  user filter processing data from said image frames to remove parts of said image frames corresponding to parts of a user or user pen writing or drawing on said whiteboard;
  wherein said user filter processing comprises: temporally filtering said image frames with a user filter time constant to distinguish said user/pen from said writing or drawing on said whiteboard; and filtering to distinguish between motion of said user/user pen parts in said image frames and writing/drawing image information in said image frames which appears or changes during said writing or drawing but which is thereafter substantially unchanging; and
  outputting writing/drawing data from said user filter processing, wherein said writing/drawing data defines captured writing or drawing on said whiteboard.

2. The method of claim 1, wherein said user filter processing comprises subdividing said image frames into blocks for blockwise processing, said blockwise processing comprising determining when the image content of a block has changed by less than a threshold over a user filter time interval; and in response identifying that the block does not include user/pen parts.

3. The method of claim 2, wherein said determining comprises comparing corresponding blocks in frames at different times to determine a measure of a difference between pixel values of the blocks; comparing said measure against said threshold; determining a time period for which said measure is less than said threshold; and identifying that the block does not include user/pen parts when said measure is less than said threshold for greater than said user filter time interval.

4. The method of claim 1, wherein said user filter processing comprises subdividing said image frames into blocks for blockwise processing, wherein the area of a block in square pixels is at least ten times the area of the tip of a pen writing or drawing on said whiteboard.

5. The method of claim 1, the method further comprising: brightness or color normalization processing of said image frames for said user filter processing.

6. The method of claim 5, the method further comprising: subdividing said image frames into blocks; wherein said brightness or color normalization processing comprises normalizing the brightnesses or colors of pixels within said blocks.

7. The method of claim 6, wherein said normalizing the brightnesses or colors of pixels within said blocks comprises normalizing according to a brightness or color percentile greater than the 50th percentile.

8. The method of claim 1, the method further comprising spatially filtering said image frames to attenuate changes in illumination across said whiteboard as seen by said camera.

9. The method of claim 1, wherein said camera data is from a camera directed at an acute angle towards said whiteboard and said image frames comprise successive images of said whiteboard from said acute angle; the method further comprising distortion correction processing to correct for distortion resulting from said acute angle direction of said camera.

10. The method of claim 9, wherein said distortion correction processing comprises applying a projective transform to said camera data to provide corrected image frame data for said image frames, and wherein said user filter processing operates on said corrected image frame data.

11. The method of claim 1, the method further comprising:
  applying a fisheye distortion correction to said camera data.

12. The method of claim 1, the method further comprising:
  cleaning said data from said user filter processing by blockwise thresholding.

13. The method of claim 1, the method further comprising: successively updating said writing/drawing data to provide dynamic capture of said writing or drawing on said whiteboard.

14. The method of claim 1, the method further comprising:
  using a camera to capture a succession of images of the whiteboard; and transmitting said writing/drawing data to a remote location for sharing.

15. A non-transitory data carrier carrying processor control code to, when running, implement the method of claim 1.

16. Whiteboard sharing apparatus comprising:
  a camera to be directed to capture an image from a whiteboard; and
  signal processing apparatus, coupled to said camera and configured to:
  input camera data for a succession of image frames, wherein said camera data is from a camera directed towards said whiteboard and said image frames comprise successive images of said whiteboard from said camera
  user filter process data from said image frames to remove parts of said image frames corresponding to parts of a user or user pen writing or drawing on said whiteboard;
  wherein said user filter processing comprises: temporally filtering said image frames with a user filter time constant to distinguish said user/pen from said writing or drawing on said whiteboard; and filtering to distinguish between motion of said user/user pen parts in said image frames and writing/drawing image information in said image frames which appears or changes during said writing or drawing but which is thereafter substantially unchanging; and
  output writing/drawing data from said user filter processing, wherein said writing/drawing data defines captured writing or drawing on said whiteboard.

17. The whiteboard sharing apparatus of claim 16, wherein said camera is directed at an acute angle towards said whiteboard and said image frames comprise successive images of said whiteboard from said acute angle; and
  wherein said signal processing apparatus is further configured to process said image frames to correct for distortion resulting from said acute angle direction of said camera.

18. The whiteboard sharing apparatus of claim 16, wherein said user filter processing comprises subdividing said image frames into blocks for blockwise processing, said blockwise processing comprising determining when the image content of a block has changed by less than a threshold over a user filter time interval; and in response identifying that the block does not include user/pen parts.

19. The whiteboard sharing apparatus of claim 16, wherein said signal processing apparatus is further configured to subdividing said image frames into blocks and normalize the brightnesses or colors of pixels within said blocks prior to said user filter processing.

* * * * *